UNITED STATES PATENT OFFICE 2,806,056

PRODUCTION OF AMINO SULFONIC ACIDS

Hans Feichtinger, Duisburg, Beeck, Germany, assignor to Ruhrchemie Aktiengesellschaft, Oberhausen-Holten, Germany, a corporation of Germany No Drawing. Application June 17, 1953,
Serial No. 362,426

Claims priority, application Germany June 24, 1952

11 Claims. (Cl. 260—513)

This invention relates to improvements in the production of amino sulfonic acids.

The introduction of a sulfo-chloride group into hydrocarbons of the alkane and cyclo-alkane series by means of the Reed reaction (see U. S. patent application No. 2,046,090) is known.

This reaction is effected by passing approximately molar quantities of sulfur dioxide and chlorine through a hydrocarbon of the alkane or cyclo-alkane series, while irradiating with actinic light. The reaction may also be effected without the benefit of irradiation by using in addition radical-forming substances. The two gases enter the hydrocarbon molecule in a radical chain reaction. The main reaction which occurs with the splitting off of hydrogen chloride includes the replacement of a hydrogen atom of the alkane chain by a sulfo-chloride group. The distribution of the sulfo-chloride group within the hydrocarbon molecule proceeds with statistical regularity.

In addition to hydrocarbons, the Reed reaction has also been applied to hydrocarbon derivatives, such as alkyl chlorides, aliphatic alcohols having more than 6 carbon atoms and straight-chain mono-olefins having 12–24 carbon atoms. In the case of these hydrocarbon derivatives, it was also possible to introduce a sulfo-chloride group into the molecule.

It did not appear, however, that this reaction was applicable to basic nitrogen compounds. If small amounts of such compounds, as, for example, pyridine, quinoline, aniline and cyclohexylamine are present in the radical-controlled reaction of hydrocarbons, this reaction is entirely inhibited at room temperature (see, for example, H. Kroepelin and co-workers, "Erdoel und Kohle," vol. 2, page 498 (1949); "Angewandte Chemie," vol. 64, page 273 (1952)). The sulfur dioxide and chlorine charged would not tend to form a radical on the amine and would only form sulfuryl chloride. For this reason, prior to the instant invention, aliphatic amines have not been subjected to the Reed reaction.

One object of this invention is the introduction of a sulfo-chloride radical into the aliphatic chain of an aliphatic amine which reaction proceeds according to the following equation:

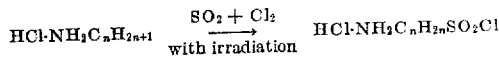

A further object of this invention is the production of aminosulfonic acids by a hydrolytical conversion according to the equation

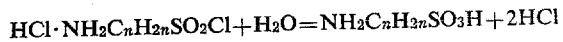

These, and still further objects will become apparent from the following description:

It has now been found that aliphatic amine hydrochlorides react extremely easily with chlorine and sulfur dioxide containing gases if the same are contacted in the presence of a chloro-hydrocarbon and preferably carbon tetrachloride while being irradiated with actinic light. It is preferable that the aliphatic amine hydrochlorides be dissolved or suspended in carbon tetrachloride, while being irradiated with the actinic light. During the reaction the sulfo-chloride radical will enter the aliphatic chain, thereby forming the hydrochlorides of the alkamine sulfo-chlorides. With the proper selection of the reaction conditions the reaction proceeds within a relatively short time. The treatment with sulfur dioxide and chlorine is preferably effected so that only a portion of the base hydrochloride used as a starting product reacts. This is done, since a chlorination forming chlorinated hydrocarbons also occurs during the reaction. After termination of the reaction the sulfonic acid chlorides formed are subjected to hydrolysis without the necessity of the same being previously isolated. This hydrolysis may be effected by simply boiling the reaction mixture which has been freed from the chlorine hydrocarbons and the sulfuryl-chloride formed with several times its quantity of water. The hydrolysis proceeds in a homogeneous phase. The isolation of the reaction product is effected by evaporating the hydrochloric acid formed in the saponification process and by precipitating the amine sulfonic acid formed with anhydrous alcohol.

It is possible by means of the process in accordance with the invention to obtain in an extremely simple manner compounds as, for example, 1-amino-butane-sulfonic-(x) acid, 1-amino-pentane-sulfonic-(x) acid, 1-amino-hexane-sulfonic-(x) acid, and 1-amino-dodecane-sulfonic-(x) acid from n-butylamine, n-pentylamine, n-hexylamine, and n-dodecylamine, respectively. The process, however, is by no means limited to these amines, but is correspondingly applicable to other aliphatic primary, secondary or tertiary amines.

The process in accordance with the invention may be effected in equipment similar to the equipment conventional for sulfo-chlorination. The chlorine and sulfur dioxide containing gases should contain 3 parts by volume of sulfur dioxide and preferably 1–1.5 parts by volume of sulfur dioxide per part by volume of chlorine. The reaction is effected by passing these reaction gases through the amine hydrochloride which is present in suspension and/or solution in the chloro-hydrocarbon such as carbon tetrachloride, while maintaining a reaction temperature of about 10–80° C.

When using carbon tetrachloride, the concentration of the amine salts in the solvent or suspending agent may vary within wide limits. The diluting ratio may be from 1:5 to 1:50. For the conversion of amines of the lower alkane series the quantity of the solvent used is suitably such that two layers will be formed. After the reaction in this case the sulfuryl chloride formed in small quantities during the reaction may be withdrawn from the upper layer which contains the resulting sulfochlorinated amine hydrochloride, by extraction with freshly charged carbon tetrachloride. When processing higher alkylamine hydrochlorides, it is advantageous to remove the solvent and the sulfuryl chloride formed by distillation, and preferably by vacuum distillation.

The products obtained in the above manner may be mixed with water in any proportion for the hydrolization. By hydrolyzing with 5 to 20 times and preferably 10 times by volume the quantity of water, amino-sulfonic acids are formed. The hydrochloric acid formed during the hydrolyzing may be removed by distillation and the amino-sulfonic acid may be precipitated from the residue in the conventional manner, using absolute alcohol.

The raw amino-sulfonic acids obtained, a small portion of which are chlorinated at the carbon chain, are white to faintly yellow in color and are easily purified by recrystallization from aqueous alcohol. They are valuable starting materials for further organic syntheses.

The following examples are given by way of illustration and not limitation:

Example 1

The sulfo-chlorination was carried out in a vessel with stirrer, which had the form of a cylindrical tube. This tube was provided with a long stirrer, a thermometer and lateral inlet nozzles for the reaction gases. In the lower part, a drain cock with a wide cock plug was provided to permit rapid draining of viscous liquids. The lateral nozzles for blowing in the gases were connected in such a manner that during the passage of the gases a rapid and thorough mixing occurred by means of the stirrer which was located closely above the outlet opening. The stirrer was movable in the direction of its longitudinal axis and could be adjusted during the conversion in such a manner that as fine as possible a distribution of the rising gas bubbles resulted. Depending on the viscosity of the reaction mixture, a somewhat different setting of the stirrer was required to obtain optimum mixing of the gas bubbles within the liquid phase. The upper end of the reaction tube terminated in the ground support of the stirrer below which a latterally fused-in reflux condenser with a calcium chloride tube mounted thereupon was attached.

The solution to be converted consisted of 30 grams n-pentylamine and 300 cc. carbon tetrachloride, and was charged through a filling nozzle provided at the upper part of the reaction tube. After having started the stirrer, a current of hydrogen chloride was blown through at a low velocity, which neutralized the base applied to give the hydrochloric salt. This resulted in a considerable heating up of the liquid so that cooling had to be provided for.

After cooling, gaseous chlorine and sulfur dioxide in a proportion of 1:2.2 were pressed through the liquid at a temperature of 45–55° C. while irradiating with a mercury vapor lamp of 80 watt. After 3.75 hours, the stirrer was stopped. During this time, 19.1 liters of chlorine had passed through the inlet pipe. The sulfochlorinated reaction mixture formed two phases which separated from each other. The lower layer consisted substantially of carbon tetrachloride and sulfuryl chloride, and was drained. The remaining upper layer was shaken out several times with carbon tetrachloride to remove residual sulfuryl chloride.

Without separation or isolation of the sulfo-chlorides, the upper layer was dissolved in 300 cc. of distilled water and the solution was heated for one hour in a reflux condenser. The hydrochloric acid formed thereby was subsequently distilled off under vacuum and the residue was thoroughly dried by passing over dry air at 105° C. Thereafter, the residue was dissolved in 200 cc. of absolute alcohol. After standing for two days, 25.5 grams 1-amino-pentane-sulfonic-(x) acid which could still further be purified by recrystallization separated at −10 to −20° C. from the solution.

Example 2

30 grams n-pentylamine were converted into the hydrochloric salt by means of the apparatus used in Example 1. While irradiating with a mercury vapor lamp, the salt was treated for 3 hours with chlorine and sulfur dioxide in a proportion of 1:1.3, using a flow rate of chlorine of 5.1 liters/hr. and a temperature of 50–55° C. The reaction product which separated in two layers was freed under vacuum from the sulfuryl chloride present and from carbon tetrachloride and was then hydrolized in the manner described in Example 1.

22 grams 1-amino pentane sulfonic-(x) acid crystallized within 2 days from the anhydrous alcoholic solution by correspondingly cooling the same. It is preferable to recrystallize this product once again.

Example 3

30 grams n-hexylamine which were dissolved in 300 cc. carbon tetrachloride were converted with gaseous hydrogen chloride into the hydrochloric salt in accordance with Example 1 and treated with chlorine and sulfur dioxide in a proportion of 1:2 at about 25–30° C. while irradiating with actinic light. A total of 3.9 liters of chlorine was passed in. After the termination of the reaction, the water-white reaction product was drained and the solvent and the sulfuryl chloride formed were driven off under vacuum, thereby recovering the sulfochlorinated reaction product. After hydrolyzing with five times the quantity of water and further processing according to Example 1, 4.0 grams 1-amino hexanesulfonic-(x) acid were obtained which was further purified by recrystallization.

Example 4

30 grams n-dodecylamine were dissolved in 200 cc. carbon tetrachloride and converted with gaseous hydrogen chloride into the hydrochloric salt, in the manner described in Example 1. While irradiating with ultraviolet light, 4.8 liters/hr. of chlorine in the form of a gas mixture which contained chlorine and sulfur dioxide in a proportion of 1:1.5 were passed in at a temperature of 25–30° C.

The processing and the hydrolysis of the reaction product was effected in the manner described in Example 2. From the anhydrous alcoholic solution there crystallized at −10° C. after several days 5.3 grams 1-amino decanesulfonic-(x) acid which was still further purified by recrystallization.

Example 5

In accordance with Example 1, 30 grams n-butylamine were dissolved in 200 cc. carbon tetrachloride and neutralized with gaseous hydrogen chloride. While irradiating the suspension with ultraviolet light of a 500 watt lamp, 5.1 liters of a gas mixture containing chlorine and sulfur dioxide in a proportion of 1:1.9 were passed in. The reaction temperature was about 35–45° C.

The processing and hydrolysis of the reaction product were effected according to Example 2. From the anhydrous alcoholic solution there crystallized at −10° C. approximately 50 grams of raw 1-amino butane-sulfonic-(x) acid which was still further purified by recrystallization.

Example 6

In accordance with Example 1, 30 grams methyl-butylamine were dissolved in 300 cc. carbon tetrachloride and, after neutralization with hydrogen chloride, treated for 10 hours at 40° C. with 2.64 liters/hr. of gaseous chlorine and 3.50 liters/hr. of gaseous sulfur dioxide while irradiating with ultraviolet light. After the reaction, an oily liquid separated which was washed with carbon tetrachloride and heated for 3 hours with 8 times its quantity of water in a reflux condenser. After evaporation of the aqueous hydrochloric acid formed, the residue was treated with absolute alcohol. 20 grams 1-methylamino-butane-sulfonic-(x) acid were obtained as the end product.

Example 7

30 grams dimethyl-butylamine were dissolved in 300 cc. carbon tetrachloride in the manner described in Example 1. After the neutralization carried out with hydrogen chloride, the solution was treated for 20 hours at 40–45° C. with 2.64 liters/hr. of gaseous chlorine and 3.5 liters/hr. of gaseous sulfur dioxide while irradiating with ultraviolet light. This was followed by hydrolizing for 5 hours with 12 times the quantity of water. After evaporation of the aqueous hydrochloric acid under vacuum, the residue was treated with absolute alcohol. 8 grams 1-dimethylamino-butane-sulfonic-(x) acid were obtained as the end product.

I claim:

1. Process for the production of amino sulfonic acids which comprises contacting an aliphatic amine hydrochloride with chlorine and a sulfur dioxide containing gas which contains from 1 to 3 parts by volume of sulfur dioxide per part by volume of chlorine at a temperature of 10–80° C. in the presence of carbon tetrachloride, while irradiating with actinic light separating the chloro-hydrocarbon and formed sulfuryl chloride from the resulting sulfochlorination product hydrolyzing the sulfochlorination product with water in amount of 5 to 20 times the volume of the sulfochlorination product and recovering the amino sulfonic acid formed by evaporating off hydrogen chloride after said hydrolysis and precipitating the residue with absolute alcohol.

2. Process acording to claim 1, in which said gas contains 1 to 3 parts by volume of sulfur dioxide per part by volume of chlorine.

3. Process according to claim 1, in which said gas contains 1 to 1.5 parts by volume of sulfur dioxide per part by volume of chlorine.

4. Process according to claim 1, in which said aliphatic amin hydrochloride is suspended in said carbon tetrachloride.

5. Process according to claim 1, in which said aliphatic amine hydrochloride is suspended in said carbon tetrachloride.

6. Process for the production of amino sulfonic acids, which comprises contacting an aliphatic amine hydrochloride with a chlorine and sulfur dioxide containing gas in the presence of carbon tetrachloride, while irradiating with actinic light, and hydrolyzing the formed sulfo-chlorination products and recovering an amino sulfonic acid.

7. Precess in accordance with claim 6, in which said gas contains 1–3 parts by volume of sulfur dioxide per part by volume of chlorine.

8. Process in accordance with claim 1, in which said gas contains 1–1.5 parts by volume of sulfur dioxide per part by volume of chlorine.

9. Process in accordance with claim 6, in which said contacting is effected at a temperature of 10–80° C.

10. Process in accordance with claim 6, in which said aliphatic amine hydrochloride is suspended in said carbon tetrachloride.

11. Process in accordance with claim 6, in which said aliphatic amine hydrochloride is dissolved in said carbon tetrachloride.

References Cited in the file of this patent

UNITED STATES PATENTS

| | | |
|---|---|---|
| 2,193,824 | Lockwood et al. | Mar. 19, 1940 |
| 2,346,569 | Fox | Apr. 11, 1944 |
| 2,383,319 | Kharasch | Aug. 29, 1945 |
| 2,408,300 | Dillon | Sept. 24, 1946 |
| 2,528,320 | Roberts et al. | Oct. 31, 1950 |
| 2,718,495 | Dazzi | Sept. 20, 1955 |

UNITED STATES PATENT OFFICE

CERTIFICATE OF CORRECTION

Patent No. 2,806,056 September 10, 1957

Hans Feichtinger

It is hereby certified that error appears in the printed specification of the above numbered patent requiring correction and that the said Letters Patent should read as corrected below.

Column 5, line 17, for "amin" read --amine--; column 6, line 3, for "Precess" read --Process--; column 6, line 6, for the claim reference numeral "1" read --7--.

Signed and sealed this 12th day of November 1957.

(SEAL)
Attest:

KARL H. AXLINE
Attesting Officer

ROBERT C. WATSON
Commissioner of Patents